United States Patent [19]
Davenport et al.

[11] 3,885,324
[45] May 27, 1975

[54] METHOD AND DEVICE FOR TEACHING SAFE DRIVING

[76] Inventors: Alvan F. Davenport, 41 Rancho Vista, El Sobrante, Calif. 94803; Ralph F. Gerken, 5549 Sapunor Way, Carmichael, Calif. 95608; Jacob H. Wiens, 130 Crest Rd., Woodside, Calif. 94062

[22] Filed: Jan. 2, 1974

[21] Appl. No.: 430,232

[52] U.S. Cl. ............................... 35/11; 73/516 LM
[51] Int. Cl. ...................... G09b 9/04; G01p 15/08
[58] Field of Search .......... 35/11, 9 C, 9 D, 22 R; 73/500, 514, 515, 516 LM

[56] References Cited
UNITED STATES PATENTS

| | | | |
|---|---|---|---|
| 1,370,320 | 3/1921 | Klein | 73/515 |
| 2,063,495 | 12/1936 | Elsom | 73/500 X |
| 2,134,092 | 10/1938 | Whipple | 73/500 |
| 2,386,777 | 10/1945 | Bentley, Jr. | 73/514 X |
| 2,662,956 | 12/1953 | Bareford | 73/516 LM X |
| 2,860,422 | 11/1958 | May | 35/9 C |
| 2,971,270 | 2/1961 | Hasty | 35/11 |
| 3,015,958 | 1/1962 | Dove | 73/516 LM |
| 3,562,927 | 2/1971 | Moskowitz | 35/22 R |

*Primary Examiner*—Grieb Wm. H.
*Attorney, Agent, or Firm*—James R. Cypher

[57] ABSTRACT

A method of teaching safe driving utilizing the concept of making gradual changes of speed and direction. A device emits audible sounds to indicate when a prescribed speed change gradient has been exceeded. The device consists of a closed tubular system partially filled with an electrical conducting fluid such as mercury. An upright portion of the fluid system contains electrical contacts at different elevations. Changes in speed or direction of the vehicle cause the fluid to rise in the tube and contact the various electrical contacts. The contacts thus energized send electrical signals to a speaker which gives an audible alarm. An electrical system is provided which causes a different frequency tone to be emitted for various gradients of speed or direction changes. The device may be selectively programmed to emit audible signals at different sensitivities to changes in speed and direction.

8 Claims, 8 Drawing Figures

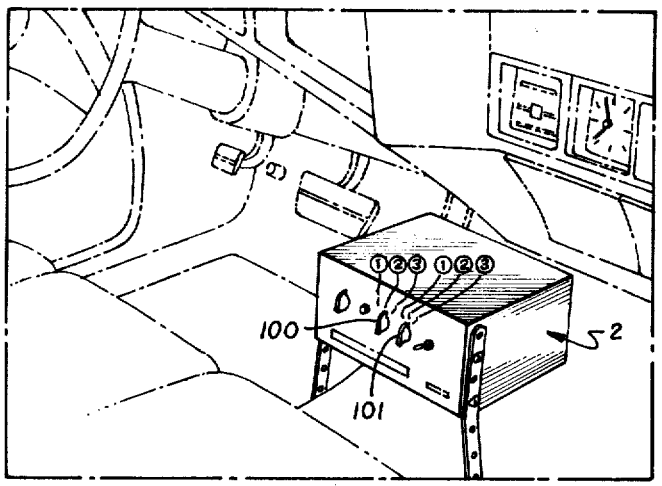
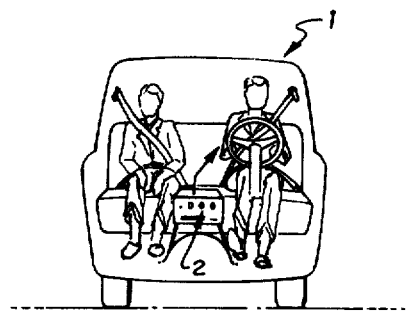
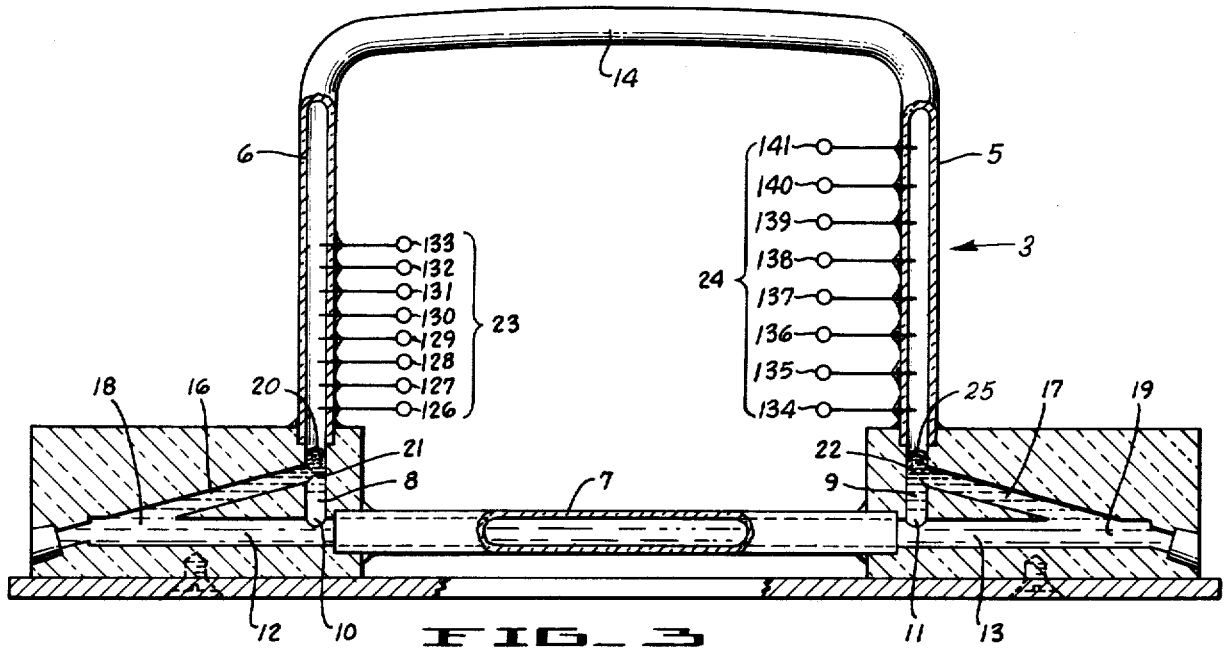
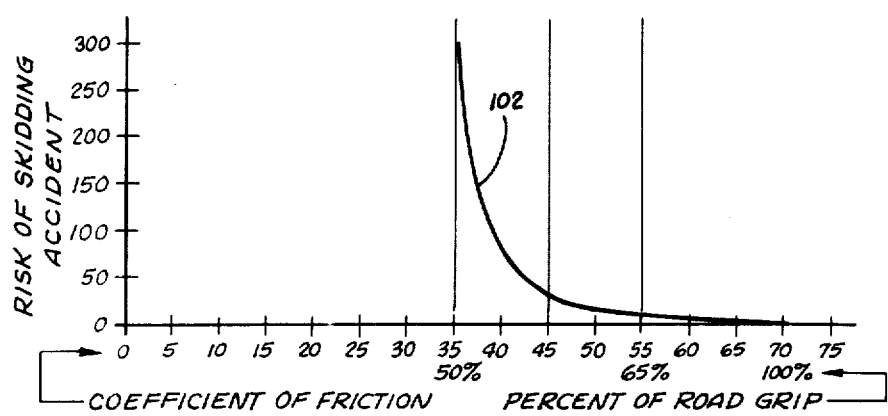

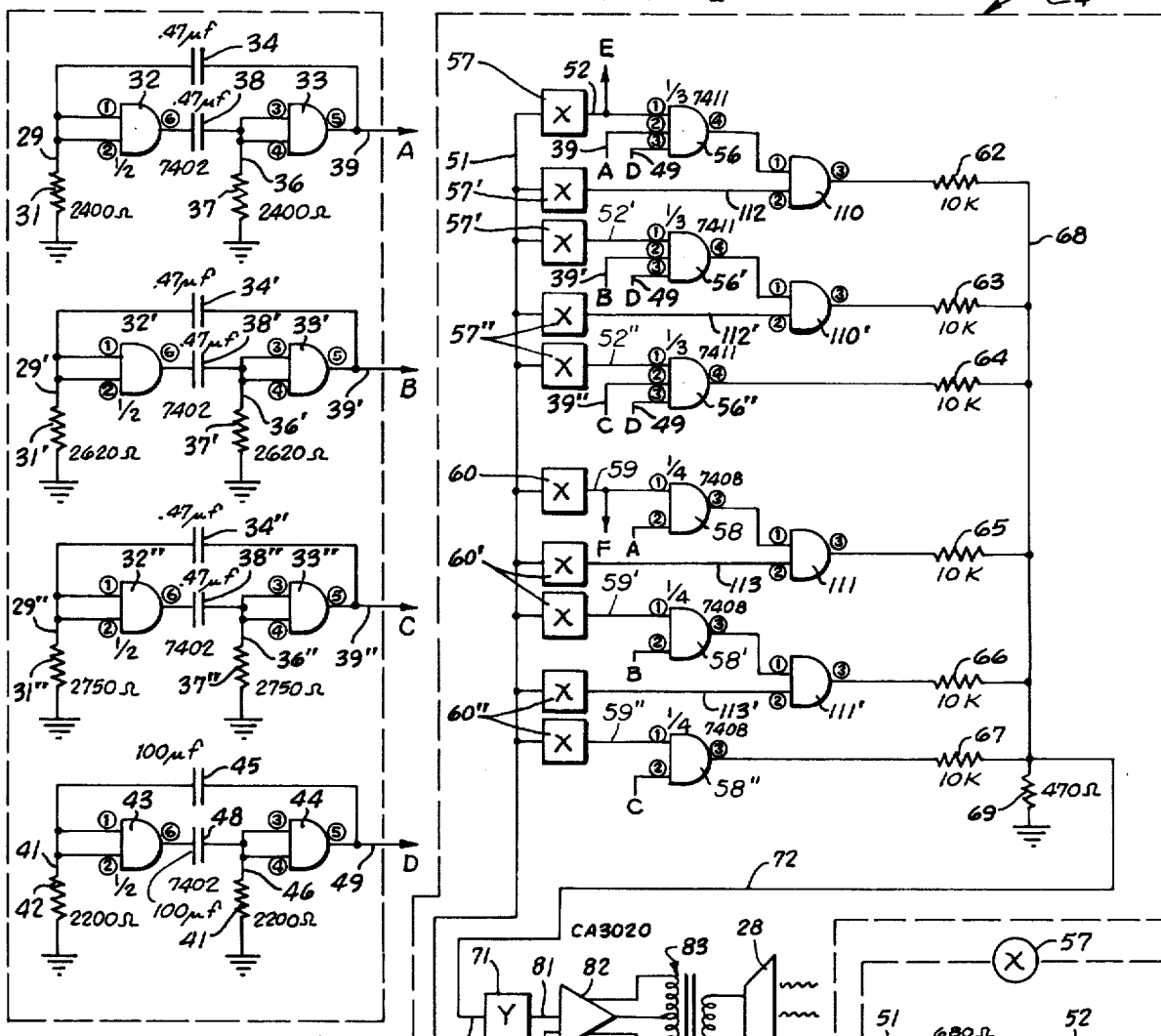
FIG_5
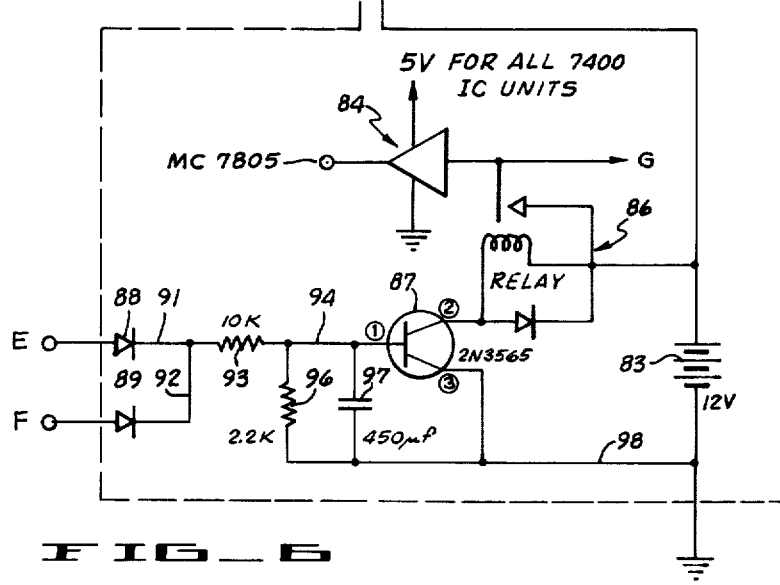
FIG_6
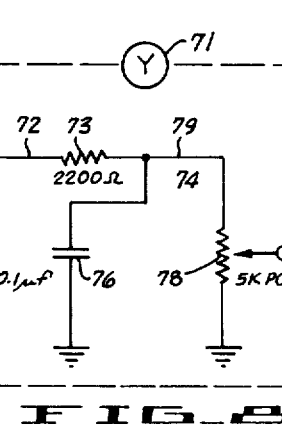
FIG_7
FIG_8

3,885,324

METHOD AND DEVICE FOR TEACHING SAFE DRIVING

BACKGROUND OF THE INVENTION

The number of persons killed in automobile and truck accidents in the United States now stands at the incredible figure of 56,000. Several hundred thousand are injured and the property loss is staggering.

Driver training in collision avoidance has been carried on for a number of years but has failed to halt the steady climb of injuries and fatalities. The government has sponsored a multimillion dollar program to develop crash-worthy automobiles. These vehicles have been tested, crashed and evaluated but the results are inconclusive. Making the vehicles crashworthy with air bags, belts and padding is expensive and unfortunately has met with only limited public acceptance.

Training drivers for collision avoidance has moved through certain distinct stages. Unfortunately, each stage has met with only limited success in accident reduction. These stages have included (1) skill development; (2) stress on reaction time and minimum braking distance; (3) driver attitude; (4) defensive driving; (5) emergency driver skill, such as skid control, off-road recovery, evasive maneuvering and handling with tire blow-outs. The major reason for their lack of success in reducing traffic accidents was the generally misunderstood function of "time" in preventing collisions. What is needed is a standardized system of driving which gives all drivers more time to prevent collisions. Smooth driving, to the standards set by the Safety Tutor, makes a major contribution of time to prevent collisions to the driver and others near him.

SUMMARY OF THE INVENTION

The method of teaching safe driving set forth herein utilizes all aspects of present methods of teaching collision avoidance with one significant addition; namely, teaching a driving technique in which only a small percentage of the available coefficient of friction between the tires and the road surface is utilized at all times. This method is chiefly characterized by learning to change speed and direction gradually. This gradual change of speed and direction is sometimes known as "smooth" driving. Heretofore, it has been practically impossible to objectively set a standard and train others to follow since "smooth" driving has been thought to be subjective to the personal dictates of the instructor.

Under the "Davenport" margin of safety concept, a percentage of normally available coefficient of friction was chosen which would give most drivers a reasonable margin for safety. The device of the present invention is mounted in the vehicle, and if the automobile is driven so that the change of speed or direction creates forces which exceed the acceptable standard, an audible alarm is sounded. The device may also be programmed to indicate the forces at which given change of speed or change of direction will cause loss of traction or skidding on wet concrete pavement, wet asphalt pavement or hard packed snow.

An object of the present invention is to teach a method of safe driving by giving drivers more time to prevent collisions by using the equipment described which will effectively reduce vehicle accidents thereby substantially reducing the loss of life, health and property on the highways and streets of this country.

Another object is to teach persons how to drive safely under adverse conditions such as wet concrete, wet asphalt pavement or even hard packed snow conditions while actually using dry pavement roads.

Still another object is to teach a method of driving so that an objective standard of what constitutes "smooth" driving can be effectively taught to passenger car drivers and bus drivers so that passengers may enjoy a comfortable, safe and anxiety-free ride.

Still another object is to teach a method of driving so that new drivers or old drivers can be trained to drive smoothly thus resulting in a reduction of fuel costs, a reduction of wear on tires, a reduction on strain on engines, transmissions and brakes thereby resulting in less repair and maintenance costs.

Finally, an object of the present invention is to provide an apparatus for a method of teaching safe driving which has a casual relationship with the ability of the vehicle to stay in non-skidding relationship with the road surface. The apparatus can further be set to give signals at certain preselected settings which are expressed in percentages of normally available road grip.

Other advantages of the Safety Tutor device are that it:

1. Is easy to install and simple to operate.
2. Produces audible rather than visual signals which may divert the driver's attention.
3. Provides different tones for three levels of excessive accelerating, braking, and turning.
4. Teaches smooth driving by improving driving habits involving accelerating, braking, and turning.

Smooth driving gives you and other drivers around you time to adjust to changes in speed and direction; also time to compensate for driver error or distraction.

Smooth driving results in increased passenger comfort and safety.

Smooth driving reduces driver stress and fatigue.
5. Responds impartially to all drivers.
6. Applies latest teaching theory of immediate feedback.
7. Provides instant, accurate responses which occur at the exact time of the driver's improper action.
8. Provides a standard for measuring smooth driving.
9. Teaches "planning ahead," a key to safe driving.
10. Frees instructor to concentrate on things that call for human judgement.

BRIEF DESCRIPTION OF THE DRAWINGS

FIG. 1 is a perspective drawing of the device of the present invention mounted on the floor in front of the front seat of an automobile.

FIG. 2 is a cross section of an automobile showing the device of FIG. 1 mounted in an automobile.

FIG. 3 is an enlarged element of the present invention used in the device shown in FIGS. 1 and 2.

FIG. 4 is a graph which shows the risk of a skidding accident as the coefficient of friction between the tires and the rod surface decreases.

FIG. 5 is a schematic drawing of a portion of the electrical circuit diagram used in the device of the present invention, which creates the three tone signals.

FIG. 6 is a schematic drawing of a portion of the electrical diagram used in the device of the present invention, FIG. 7 is a schematic drawing of a portion of the electrical circuit diagram used in the device of the present invention depicting the mercury switch.

FIG. 8 is a schematic drawing of a portion of the electrical circuit diagram showing the passive low pass filter.

BRIEF DESCRIPTION OF THE PREFERRED EMBODIMENTS OF THE INVENTION

The Safety Tutor system of the present invention for a vehicle 1 providing variable acceleration, deceleration and turning forces consists briefly of a tutor means 2 (FIG. 1); adapted for mounting on the vehicle; the tutor means having sensing means 3 (FIG. 3) for independently sensing the degree of change in acceleration and deceleration, a second tube similar to that shown in FIG. 3 (except that both vertical columns are similar to the connections indicated by 24) indicates turning errors and turning of the vehicle; and audible signaling means 4 (FIGS. 5 through 8) connected to the sensing means separately indicating the acceleration, deceleration and turning.

The sensing means for sensing acceleration and deceleration of the vehicle consists briefly of a closed tubular system as shown in FIG. 3 and includes a pair of spaced vertical tubes 5 and 6, a first generally horizontal reservoir tube 7 connecting the lower ends 8 and 9 of the spaced vertical tubes at intersections 10 and 11 and extending outwardly therefrom by means of extensions 12 and 13; a second generally horizontal tube 14 connecting the upper ends of the spaced vertical tubes; first and second connecting tubes 16 and 17 each connecting the extension ends 18 and 19 of said first horizontal reservoir tube with one of said vertical tubes adjacent the lower ends of said vertical tubes at intersections 21 and 22. The tube system contains sufficient fluid to fill extension 13, connecting tube 17, vertical tube 5 to a height of contact 41 and a portion of horizontal tube 7. A height gradient indicia means 23 and 24 is mounted on the vertical members for indicating the height of the fluid in the vertical tubes during acceleration, deceleration or change of direction of the vehicle.

The tubular system, or at least the vertical tubes, when used to visually indicate acceleration, deceleration or turning are transparent or translucent and the fluid should be colored so that the level of the fluid in the vertical tubes may be easily and quickly perceived. The purpose of the unique configuration of the tubular system is to eliminate the formation of bubbles in the fluid which would cause a distorted reading of the level of the fluid in the vertical tubes. It has been found that it is almost impossible to create a bubble in the present system because of the unique configuration of the tubes. In the few instances that a bubble is created, it is easily eliminated by tilting the tubular system until all the fluid is drained to one end of the horizontal tube and to one vertical tube and the end point of the fluid clears the opposite vertical tube at its intersection with the lower horizontal tube.

Various size tubes may be used. It has been found, however, that the vertical tubes may be ⅛ inch inside diameter the horizontal tube ⅛ inch inside diameter, the extensions of the horizontal reservoir tube ¼ inch the connecting tubes about ⅛ inch, and the top connecting tube about ¼ inch inside diameter. The connecting tubes join the lower horizontal reservoir tubes at an angle of approximately 15°.

The height gradient indicia means may consist of lines placed at spaced ascending elevations. While it is possible and sometimes desirable for the driver to observe the height of the level of the fluid in relation to the indicia marks, for safety considerations he should only do so when accompanied by an instructor or other observer who could help watch for traffic hazards. When this is desirable, the tubular system should be located at approximately eye level to the driver so that he can observe it and the road ahead at the same time.

Preferably for most training purposes the sensing means is connected to an audible signaling means so that the vehicle driver's full attention may be given to steering the vehicle on a particular course and to being alert for traffic hazards. A driving error such as excessive braking, acceleration or turning can be indicated by a sounding device. In order to accomplish the foregoing, the tubes should contain an electrical conducting fluid such as mercury. The systems should contain sufficient fluid to fill the tubes as previously set forth. Instead of the visible indicia marks, a plurality of spaced electrical connectors 126 through 141 may be mounted on the vertical tubes for making electrical contact with the fluid.

If one tubing system is used and the lower horizontal tube is parallel to the longitudinal axis of the vehicle and the direction the vehicle is moving, braking and acceleration changes can be measured. Likewise, if the direction of the horizontal tube is transverse to the vehicle and the direction of the vehicle, the turning forces can be measured.

In most instances, since turning as well as braking and acceleration changes are to be indicated, the tutor will be constructed with a tubing system as shown in FIG. 3 with its horizontal tube parallel to the longitudinal axis, and a second system of tubing as shown in FIG. 3 but with height and gradient indicia means 23 being the same as indicia 24 transverse to the vehicle or at right angles to the first tubing system.

The operation of the sensing means shown in FIG. 3 is as follows: assuming that the tubular system is being moved at a constant rate to the right, the liquid will remain in the lower horizontal tube and will remain at equal levels in the vertical tubes to points 20 and 25 as shown in the drawing. If, however, movement to the right is decelerated, the liquid in the right tube will rise and the liquid in the left vertical tube will fall. The rise of the liquid in the right tube is nearly proportional to the amount of deceleration. The liquid level could rise to a level above the last connection numbered 141. At the same time that the liquid is draining from the left vertical tube, it is also draining from the connector tube 16 and the reservoir extension tube 12. It should be noted that any air bubbles that are trapped in the tubes will be eliminated as they pass any intersection of two tubes. At the same time, during a reversal of the flow of the liquid, any air bubbles trapped in the tubes will be eliminated as the air bubbles approach an intersection of any two tubes. Thus, while a false reading may occur for the first deceleration or acceleration after installation it will be corrected automatically by one or two reversals of the flow of the liquid.

The signaling means consists of a speaker 28 and an interconnecting electrical circuitry shown in FIGS. 5 through 8. Three tone signals with an approximate frequency of 480 Hz, 600 Hz and 720 Hz are generated by one half of a SN-7402, a quadruple 2-input positive NOR gate. Each circuit consists of two gates in a feedback connection which results in a square signal output identified as "A," "B," and "C."

Referring specifically to FIG. 5, circuit 29 is connected to ground through 2,400 ohm resistor 31, to pins 1 and 2 of NOR gate 32 and to output pin 5 of NOR gate 33 through 0.47 µf capacitor 34. Circuit 36 is connected to ground through 2400 ohm resistor 37, to output pin 6 of NOR gate 32 through 0.47 µf capacitor 38 and to input pins 3 and 4 or NOR gate 33. The interconnecting of these circuits creates the square wave signal output identified as "A" through circuit 39, which creates a frequency of about 480 Hz.

A square wave signal output identified as "B" is created by a circuit similar to the above described circuits. Similar circuits and parts are identified by prime numbers (') and are not further described. Capacitor 34' is 0.47 µf and resistor 37' is 2,620 ohms. Resistance 31' is 2,620 ohms.

A square wave signal output identified as "C" is created by a circuit similar to the above described circuits. Similar circuits and parts are identified by double prime numbers (") and not further described. Capacitor 34" is 0.47 µf and resistor 37" is 2,750 ohms. Capacitor 38" is 0.47 µf and resistor 31" is 2,750 ohms.

A similar circuit by which a 100 µfd capacitor in the feedback network generates an approximate 2 Hz square wave which is used to provide a "peep" signal.

Specifically, the "peep" signal consists of one half of a SN-7402, a quadruple 2-input positive NOR gate. Circuit 41 is connected to ground through 2,200 ohm resistor 42, to input pins 1 and 2 of NOR gate 43 and to pin 5 of NOR gate 44 through 100 µf capacitor 45. Circuit 46 is connected to ground through 2,200 ohm resistor 47, to the pin 6 of NOR gate 43 through 100 µf capacitor 48 and to input pins 3 and 4 of NOR gate 44. The 2 Hz square wave signal designated "D" is carried by circuit 49.

It has been found useful to create one signal for acceleration and braking and a different signal for turning. This has been accomplished by causing a "peeping" signal for acceleration and deceleration and a steady tone signal for turning.

The "peeping" signal used for the acceleration and deceleration error is produced by feeding three signals into a triple 3-input positive AND gate, each circuit consisting of one-third of a SN-7411. The first input is obtained from the mercury switch indicating the driving error and is fed to the SN-7411 through a resistive network as shown by "X" symbols in FIG. 6. The second input is one of the tone signals generated "A," "B," or "C." The third input is the 2 Hz square wave indicated by the letter "D" which allows the circuit to pass the desired tone signals at a rate of approximately 2 cycles per second or two "peeps" per second. Referring specifically to FIGS. 3 and 7, a signal is initiated when the mercury in the vertical tube rises so that a pair of circuit leads 126 and 127, 126 and 129 or 126 and 131 are both contacted. This closes the circuit in the mercury switch diagrammed in FIG. 7. The closing of the contact pairs 126–127, 126–129, or 126–131 energizes circuit 51, and current flows to circuit 52, 52' or 52" respectively through 680 ohm resistance 53 and from ground through 470 ohm resistance 54.

Referring specifically to FIG. 6, the peeping signal is produced by feeding three signals to the 3-input AND gate 56. The first input is obtained from the mercury switch (contacts 126 and 127) which is fed to pin 1 through circuit 52 from the network shown as "X" set forth in FIG. 7 and numbered 57. The second input is the "A" signal fed to pin 2 from circuit 39. The third input is the 2 Hz square wave which allows the circuit to pass the desired tone signals at a rate of approximately 2 cycles per second or two "peeps" per second and is the "D" signal from circuit 49.

The second or 600 Hz tone signal is obtained by feeding the signal created by the mercury closing the contacts 126 and 129, feeding the signal through the "X" network numbered 57' (identical to that shown in FIG. 7) thence through circuit 52' to AND gate 56' and receiving signals "B" through circuit 39' and signal "D" through circuit 49.

The third or 720 Hz tone signal is obtained by feeding the signal created by the mercury closing the contacts 126 and 131, feeding the signal through the "X" network 57" (identical to that shown in FIG. 7) thence through circuit 52" to AND gate 56" and receiving signals "C" through circuit 39" and signal "D" through circuit 49.

The steady tone signals used for the right and left turn signals are generated by feeding two signals into a quadruple 2-input positive AND gate 58, each circuit consisting of ¼ of a SN-7408. The first input is obtained from the mercury switch indicating the driving error and the signal is fed to the SN-7408 through the network shown as "X." The second input is one of the tone signals generated, "A," "B," or "C." The fourth is not used.

The steady tone signals are sensed by a tube system identical to the system shown in FIG. 3 except that the tube system for the turn indicating system is placed at right angles to the acceleration and deceleration system. In order to avoid needless duplication in drawings, the turn system will be described by referring to FIG. 3 to differentiate the separate systems, the contacts, generally referred to by the number 24 will be used to describe the turn system. It is to be understood that for the acceleration portion one vertical tube would be used and for deceleration, the other vertical tube would be used. Likewise for turning, one vertical tube would be used to indicate right turns, while the other vertical tube would indicate left turns.

Referring specifically to FIGS. 3 and 7, a signal is initiated when the mercury in the vertical tube 6 rises so that a pair of circuit leads 134 and 135, 134 and 137 or 134 and 139 are both contacted. This closes the circuit in a mercury switch which has been previously described and is diagramed in FIG. 7.

The closing of the contact pairs 134 and 135, 134 and 137 or 134 and 139 energizes circuit 59, 59' or 59" respectively after passing the circuits in mercury switch 60 which are identical to the circuitry previously described and as set forth in the example set forth in FIG. 7, the first input (closing of contacts 134 and 135) is fed to pin 1 of AND gate 58. The second input is signal "A" which is fed to pin 2 of the AND gate 58. The signal emerging from pin 3 of the AND gate 58 creates the 480 Hz steady tone signal.

The second tone is derived from the contacting by the mercury of contacts 134 and 137 which closes a mercury switch 60' identical to the circuitry as set forth in FIG. 7 and energizes circuit 59' and feeds the signal to pin 1 of AND gate 58'. The second input is signal "B" as previously described which is fed to pin 2 of AND gate 58'. The signal emerging from output pin 3 of AND gate 58' is a steady 600 Hz signal.

The third tone is derived from the contacting by the mercury of contacts 134 and 139 which closes mercury switch 60'' which is identical to the circuitry set forth in FIG. 7 and energizes circuit 59'' and feeds the signal to pin 1 of AND gate 58''. The second input is signal "C" as previously described which is fed to pin 2 of AND gate 58''. The signal emerging from output pin 3 of AND gate 58'' is a steady 720 Hz.

The circuitry thus far described would generate a single tone for each of the degrees of error. Thus, one tone for the first degree of error, two tones for the second degree of error and three tones for the third degree of error. Since two or more signals sounding at one time for one type of error would tend to be confusing, an inhibiting circuit which causes the device to generate a single tone for each of the degrees of error has been devised. Thus signal "A" is inhibited if signal "B" is also present and signals "A" and "B" are inhibited if signal "C" is present.

Referring to FIG. 6, the inhibiting circuits are as follows: The signal from output pin 4 and AND gate 56 is fed to input pin 1 of one-fourth of a quadruple two input positive NOR gate 110. Pin 2 of NOR gate 110 is connected to switch 57' by circuit 112.

In operation, when gate 2 of NOR gate 110 is at ground potential, the signal applied to gate 1 is transmitted to the output pin 3. When, however, a positive potential is applied to gate 2 of NOR gate 110, the output 3 remains at zero regardless of the signal applied to gate 1. Since gate 2 is activated by the mercury activating switch 57', this effectively suppresses the 480 Hz tone signal when the 600 Hz tone signal is activated.

Both the 480 Hz and the 600 Hz tone signals are suppressed when the 720 Hz tone signal is activated as follows: The signal from output pin 4 of AND gate 56' is fed to input pin 1 of one-fourth of a quadruple two input positive NOR gate 110'. Pin 2 of NOR gate 110' is connected to switch 57'' by circuit 112'.

In operation, when gate 2 of NOR gate 110' is at ground potential, the signal applied to gate 1 is transmitted to the output pin 3. When, however, a positive potential is applied to gate 2 of NOR gate 110', the output 3 remains at zero regardless of the signal applied to gate 1. Since gate 2 is activated by the mercury activating switch 57'', this effectively suppresses the 600 Hz tone signal when the 720 Hz tone signal is activated. The 480Hz tone signal will also remain off for the reasons set forth above.

An inhibiting circuit is also provided for the steady tone when mercury switches 60, 60' and 60'' are sequentially activated. The process for inhibiting the signal is similar to the inhibiting circuits above described and the circuitry will be only briefly described. The second steady 600 Hz tone is permitted while inhibiting the 480 Hz tone by connecting pin 3 of AND gate 58 to pin 1 of one-fourth of a quadruple two input positive NOR gate 111. Pin 2 of gate 111 is connected by circuit 113 to switch 60'.

The third steady 720 Hz tone is permitted while inhibiting the 600 Hz and 480 Hz steady tones by connecting output pin 3 of AND gate 58' to pin 1 of one-fourth of a quadruple two input positive NOR gate 111'. Pin 2 of gate 111' is connected by circuit 113' to switch 60''.

Each of the six tone signals is fed through six limiting 10 K resistors 62, 63, 64, 65, 66 and 67 which are connected respectively between output pins 3 of NOR gates 110 and 110' and pin 4 of AND gate 56'', output pins 3 of NOR gates 111, 111' and output pins 3 of AND gates 58'' and common circuit 68 which is grounded through common 470 ohms resistor 69. The resulting signal from circuit 68 is passed through a passive low pass filter diagrammed in FIG. 8 and designated by the letter "Y" and the number 71 from circuit 72 which modifies the square wave signals of the tone signals to distorted sine waves.

Filter "Y" as shown in FIG. 8 consists of 2,200 ohm resistor 73 which is connected through circuit 74 to grounded 0.1 $\mu f$ capacitor 76. A volume control is provided by a 5 K pot variable resistor 78 which receives the signal from circuit 79 and energizes circuit 81 to set the signal level that drives the RCA CA-3020, ½ watt audio amplifier 82. The amplifier 82 is matched to the loudspeaker 28 by means of a matching transformer 83.

The 7400 series logic units require a five volt supply which may be provided by battery 83 and the required voltage is obtained by use of a Motorola MC-7805-CP voltage regulator 84.

The zero resting current condition is obtained by use of a relay circuit 86 which is activated by a transistor 87 which in turn is activated by one of two steering diodes 88 and 89 which feed the necessary signal to the base of the transistor if either point "E" or point "F" is actuated by the mercury switch and indicating a driving error.

A time delay in activating the circuit is provided to eliminate minute contacts in the mercury switch by bumps on the roadway. This is produced by the passive resistor/capacitor network between the stearing diodes and the base of the relay transistor. As shown in FIG. 6, the specific network consists of circuits 91 and 92 which connect diodes 88 and 89 to 10 K resistor 93. Circuit 94 connects resistor 93 to pin 1 of 2N3565 transistor 87. A 2.2 K resistor 96 and a 450 $\mu f$ capacitor 97 are connected in parallel between circuit 94 and circuit 98 to ground. Circuit 98 is connected to one terminal of battery 83. Output pin 2 of transistor 87 is connected to relay 86 and output pin 3 of the transistor 87 is connected to circuit 98.

A tape recorder relay can be activated by the voltage at "G" shown in FIG. 6 which is connected by circuit 99 to terminal 1 of amplifier 82 and to the voltage regulator 84. A signal for the audio for the tape recorder can be obtained by a fixed resistive "volume control" attached ahead of the manual volume control 78 in "Y" of FIG. 8. This would start the tape recorder at the beginning of the time-delay cycle so that the tape recorder would be at full speed when the first "error signals" would appear as tone signals. The tape recorder would again turn off when the input error signal from the mercury switches would cease.

The Safety Tutor 2 shown in FIG. 1 has three settings for sensitivity to changes in speed and direction. A manual knob 100 is connected electrically to the tube system for indicating turns. Indicia marks "1," "2," and "3" marked on the case correspond to the different sensitivity settings. The lower the number, the greater the sensitivity. Each setting has three levels of force which sounds the first, second and third continuous tones when the vehicle exceeds each level of force. Each continuous tone sounds off as long as and until its level of force is exceeded. For example, setting "1" for turns would activate contacts 134–135 for the first signal, contacts 134–137 for the second signal, and contacts 134–139 for the third signal. If a greater force level was desired to activate the Safety Tutor, knob 100 would be turned to setting "2" which would activate contacts 134–136 for the first tone, contacts 134–138 for the second tone, and 134–140 for the third tone. If a still greater force level was desired to activate the Safety Tutor, knob 100 would be turned to setting "3" which would activate contacts 134–137 for the first tone, contacts 134–139 for the second tone, and contacts 134–141 for the third tone. As shown in FIG. 3, a greater turning force is required to cause the mercury to rise in the vertical tube, so that by merely raising the elevation of the contacts, the signal will represent and indicate the higher forces.

A manual knob 101 is connected electrically to the tube system for indicating acceleration and deceleration. Indicia marks "1," "2," and "3" marked on the case correspond to the different sensitivity settings. The lower the number the greater the sensitivity. As previously explained for the turning mode, each setting has three levels of force which sounds the first, second, and third interrupted tones. Each interrupted tone sounds off as long as and until its force level is exceeded. For example, setting "1" for acceleration would activate contacts 126–127 for the first tone, contacts 126–129 for the second tone, and 126–131 for the third tone. If a greater force level was desired to activate the safety tutor, knob 101 would be turned to setting "2" which would activate contacts 126–128 for the first tone, contacts 126–130 for the second tone, and contacts 126–132 for the third tone. If a still greater force level for acceleration was required, the Safety Tutor knob 101 would be turned to setting "3" which would activate contacts 126–129 for the first tone, contacts 126–131 for the second tone, and contacts 126–133 for the third tone.

Since acceleration involves only the force applied to the rear tires on a standard automobile and deceleration caused usually by braking involves all four tires, it is necessary to build into the device a greater force sensitivity to acceleration than to deceleration. This can be accomplished by setting the contacts for acceleration closer together and at a lower elevation than the contacts for deceleration. For example, if the tube system as shown in FIG. 3 is turned parallel to the direction of the vehicle to measure acceleration and deceleration, the left side of the system would be placed toward the rear of the vehicle and the contacts designated 23 would measure sensitivity to acceleration. The right side of the tube system would be placed facing the front of the vehicle and the contacts 24 would measure the sensitivity to deceleration of the vehicle.

The following table gives the forces which these settings and tone represent:

| Settings | Tones | Approx. % of Vehicle's Total Braking and Turning Ability | Approx. Equiv. Coefficient of Friction of Road Surfaces | Approx. % of Vehicle's Acceleration Ability |
| --- | --- | --- | --- | --- |
| No. 1 | 1 | 25% | .17 | 25% |
|  | 2 | 40% | .28 | 35% |
|  | 3 | 60% | .42 | 45% |
| No. 2 | 1 | 35% | .24 | 30% |
|  | 2 | 50% | .35 | 40% |
|  | 3 | 70% | .49 | 50% |
| No. 3 | 1 | 40% | .28 | 35% |
|  | 2 | 60% | .42 | 45% |
|  | 3 | 80% | .56 | 55% |

The figures in the table above are based on an average dry road surface with a friction coefficient of 0.70.

The No. 2 setting is the standard for most level driving on dry streets and highways. This suggests that drivers should use about one third or less of the forces available to their vehicle. Should a driver exceed this limit the Safety Tutor will continue a single tone until the force is reduced.

When the driver uses the excessive force to speed up or to brake, the single tone will be an interrupted one. If the driver is going too fast around a turn or curve, the continuous tone continues until the forces on the car fall below 35%. If the force on the vehicle exceeds 50% on the No. 2 setting, the driver will hear a higher pitched tone. Again, the interrupted tones indicate too much acceleration or braking; and the continuous tones indicate too much speed in the turns. When the forces on the vehcile exceed 70% a still higher pitch tone will sound.

Should a driver use both excessive braking and excessive turning forces in a curve at the same time, the Safety Tutor will indicate both excesses. It will emit a continuous tone for a long as the turning force exceeds 35%. In addition, an overriding interrupted tone will sound during the time the braking forces exceed 35%. This makes it easier to recognize both excessive braking and excessive turning when they occur together.

The Safety Tutor's No. 3 setting, the least sensitive, works well for all but the steepest hills. On very steep hills, it is better to turn off the Safety Tutor.

The No. 1 setting is preferably used on level highways and freeways to develop expertise in smooth driving. Driving within the 25% force limitations of the No. 1 setting on level highway and freeway curves is fairly easy. It makes passengers comfortable and gives the driver a four-to-one margin of safety on road grip. There are some road conditions which might cause a driver to further reduce his speed on curves. These would be: greatly reduced visibility or road grip, caused by snow, ice, mud, gravel, etc.

In order to brake within the 25% force limitations of the No. 1 setting on level highways and freeways, the driver must look and plan far ahead, so that he can begin braking earlier.

By using the approximate equivalent coefficient of friction of road surfaces, one can demonstrate the amount of braking or turning force that would cause loss of vehicle control under adverse conditions. This may be shown on good dry roads by selecting the proper setting and tone. For example, assume that a smooth wet asphalt road has a coefficient of friction of 0.42. To find the breakaway speed on a given curve, set the sensitivity selector on No. 1. At the sound of the third tone, you would know that the vehicle had reached breakaway speed for a road surface with a coefficient of friction of 0.42.

In FIG. 4, a graph illustrates the relationship between the risk of accident and the coefficient of friction of the road surface. Line 102 graphically shows that when the coefficient of friction is reduced to 0.35, such as packed snow, the risk of a skidding accident is very high; — 300 times more than on dry concrete. If, however, we drove as carefully and as skillfully on dry pavement as is required on packed snow there would be a 100% margin of safety. Risk of collision might be 300 times less than it is now. Statistically, this is a drop in national annual death toll from 56,000 to 200. The drop in insurance premiums could perhaps be reduced similarly. The driver who now pays $300 might have to pay only $1 per year.

The apparatus described, while primarily designed for automobiles, trucks and buses can also be used in aircraft for indicating improper turns. Further, the apparatus when mounted on a trailer can indicate swaying conditions and can be used to alert drivers to dangerous conditions so that they can avoid jack-knifing.

We claim:

1. A device for sensing acceleration and deceleration of a vehicle comprising:
  a. a closed tubular system having:
    1. a pair of spaced vertical tubes;
    2. a first generally horizontal tube connecting the lower ends of said spaced vertical tubes and extending outwardly therefrom;
    3. a second generally horizontal tube connecting the upper ends of said spaced vertical tubes;
    4. first and second connecting tubes each connecting an end of said first horizontal tube with one of said vertical tubes adjacent the lower end of said vertical tubes;
  b. a plurality of height gradient indicia marks spaced at ascending intervals on said vertical members for indicating the height of said fluid in said vertical tubes during acceleration or deceleration of said vehicle; and
  c. said tube system containing sufficient fluid to fill a portion of said first horizontal tube, all of one of said connecting tubes and a portion of said vertical tube to a height as great as the highest indicia marks on each of said vertical tubes.

2. A tutor system for a vehicle providing variable acceleration, deceleration, and turning comprising:
  a. tutor means adapted for mounting on said vehicle;
  b. said tutor means having sensing means for independently sensing the degree of change in acceleration, deceleration and turning of said vehicle;
  c. said sensing means including a closed tubular system having:
    1. a pair of spaced vertical tubes;
    2. a first generally horizontal tube connecting the lower ends of said spaced vertical tubes and extending outwardly therefrom;
    3. a second generally horizontal tube connecting the upper ends of said spaced vertical tubes; and
    4. first and second connecting tubes each connecting an end of said first horizontal tube with one of said vertical tubes adjacent the lower end of said vertical tubes;
  d. said tube system containing sufficient electrical conducting fluid to fill a portion of said first horizontal tube, all of one of said connecting tubes and a portion of said vertical tube to a height as great as the highest electrical contact;
  e. a plurality of spaced electrical connectors mounted on each of said vertical tubes for making electrical contact with said fluid; and
  f. audible signaling means connected to said sensing means separately indicating said acceleration, deceleration and turning.

3. A system as described in claim 2 comprising:
  a. said fluid consists of mercury; and
  b. said first and second connecting tubes are inclined at an angle of about 15° and have a diameter of approximately one half that of said first horizontal tube.

4. A system as described in claim 3 comprising:
  a. said sensing means consists of a pair of said closed tubular systems placed at right angles to one another.

5. A system as described in claim 4 comprising:
  a. said signaling means consists of a speaker; and
  b. electrical circuit means connecting said electrical connectors and said speaker.

6. A system as described in claim 5 comprising:
  a. said signaling means consists of:
    1. a steady tone signaling circuit means for indicating excessive turning; and
    2. intermittent tone signaling circuit means for indicating excessive acceleration or deceleration.

7. A system as described in claim 6 comprising:
  a. said steady tone signaling circuit means including a plurality of tone circuits each generating a different frequency so that an audible difference will be created for increasingly excessive turning or deceleration or acceleration.

8. A system as described in claim 7 comprising:
  a. said signaling means comprises a time delay circuit to eliminate brief contacts in the signaling circuits caused by normal non-turning, non-accelerating and non-braking movements of said vehicle.

* * * * *